United States Patent
Toor et al.

(10) Patent No.: US 7,333,474 B2
(45) Date of Patent: Feb. 19, 2008

(54) EXTENDED HANDSET FUNCTIONALITY AND MOBILITY

(75) Inventors: Kamaldip Toor, San Diego, CA (US); Steven Hayashi, Los Gatos, CA (US); Carlos V. Laux, San Ramon, CA (US); Marcio Guidorizzi de Siqueira, San Jose, CA (US); Sudhakar Srinivasa Valluru, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 767 days.

(21) Appl. No.: 10/300,040

(22) Filed: Nov. 19, 2002

(65) Prior Publication Data

US 2004/0097259 A1   May 20, 2004

(51) Int. Cl.
*H04L 12/66* (2006.01)
(52) U.S. Cl. ............ 370/352; 455/41.2; 455/41.3
(58) Field of Classification Search ......... 455/41.2, 455/41.3, 552.1, 550.1, 90.3, 422.1, 426.1; 370/280, 401, 352, 351
See application file for complete search history.

(56) References Cited

U.S. PATENT DOCUMENTS

| | | | |
|---|---|---|---|
| 6,269,086 B1 | 7/2001 | Magana et al. | 370/280 |
| 6,330,244 B1 | 12/2001 | Swartz et al. | 370/401 |
| 6,600,734 B1 * | 7/2003 | Gernert et al. | 370/352 |
| 6,826,174 B1 * | 11/2004 | Erekson et al. | 370/352 |
| 2003/0039242 A1 * | 2/2003 | Moore, Jr. | 370/354 |

FOREIGN PATENT DOCUMENTS

| | | |
|---|---|---|
| EP | 0622 924 A2 | 4/1993 |
| EP | 0766 490 A2 | 9/1995 |
| EP | 0930 766 A2 | 1/1998 |
| EP | 1150 457 A2 | 4/2000 |
| EP | 1 011 278 A2 | 6/2000 |
| WO | WO 01/65786 A1 | 9/2001 |

OTHER PUBLICATIONS

PCT Notification of Transmittal of the International Search Report or the Declaration mailed Mar. 12, 2004, re PCT/US 03/34246 filed Oct. 29, 2003 (10 pages).

* cited by examiner

*Primary Examiner*—Lewis West
(74) *Attorney, Agent, or Firm*—Baker Botts L.L.P.

(57) ABSTRACT

A system includes an enterprise network having a call control system that manages telephony services for wireless handsets. At a remote site, a computing device establishes a secure, wireline communication session with the enterprise network. The computing device also establishes wireless, packet-based links with one or more handsets. The device acts as a relay to enable the handsets to receive telephony services managed by the enterprise network even though outside of the service area of the enterprise network.

20 Claims, 3 Drawing Sheets

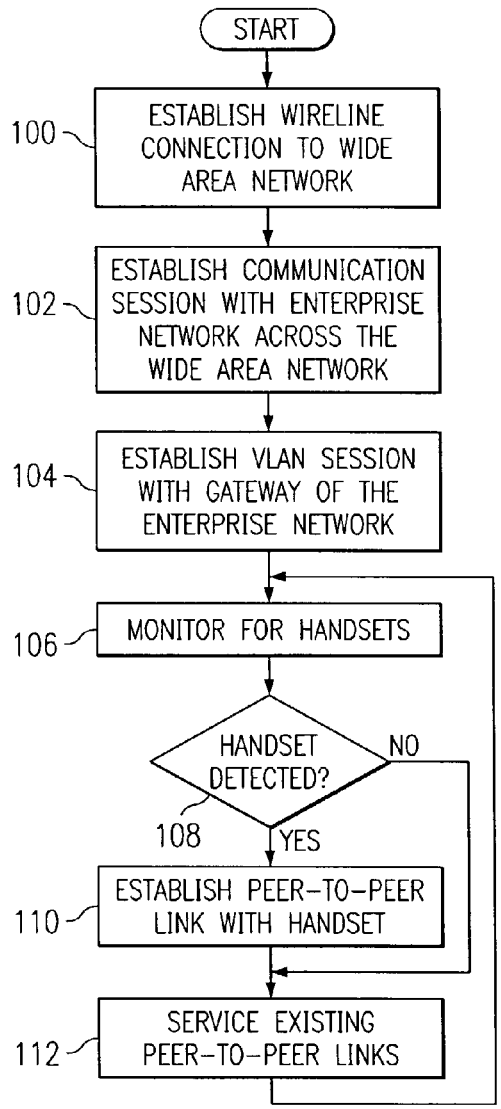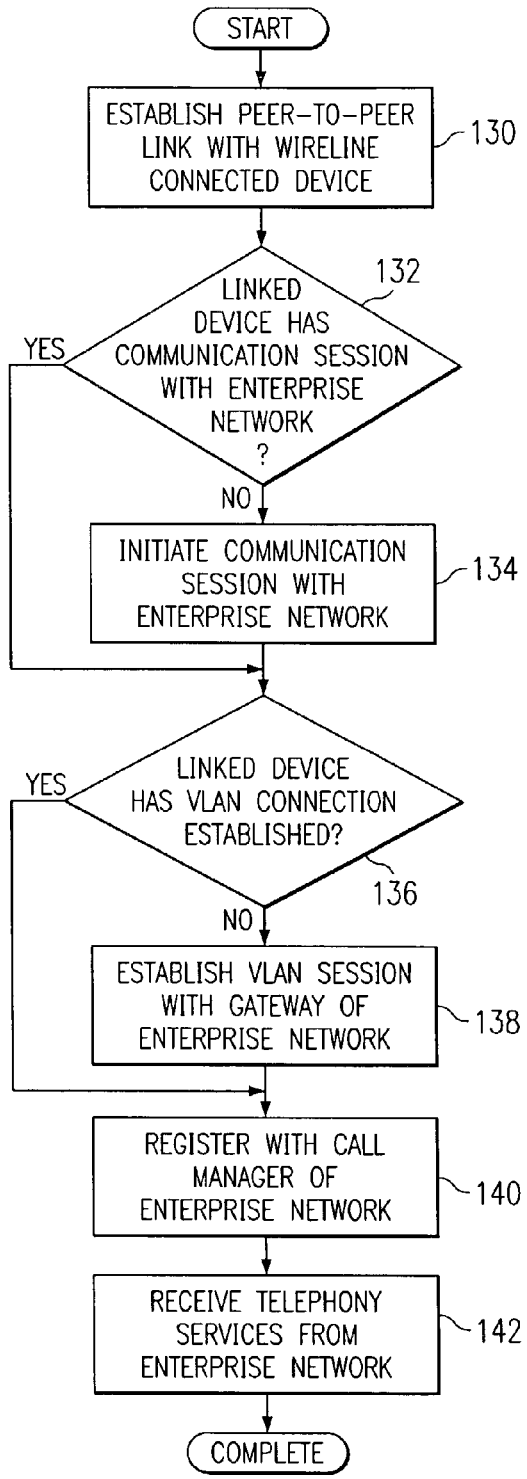

US 7,333,474 B2

EXTENDED HANDSET FUNCTIONALITY AND MOBILITY

TECHNICAL FIELD OF THE INVENTION

The present invention relates generally to wireless communications and, more particularly, to extending handset functionality and mobility.

BACKGROUND OF THE INVENTION

Wireless systems, such as 802.11 compliant systems, enable relatively short range, wireless communication of packets. These systems, originally designed for data communications, have now been put to use for telephony applications. This has introduced a range of problems, complexities, and opportunities.

SUMMARY OF THE INVENTION

In accordance with the present invention, techniques for extending handset functionality and mobility are provided.

According to a particular embodiment, a telephony handset includes a speaker, a microphone, and a wireless interface supporting 802.11 wireless communication protocols. The wireless interface establishes a wireless link with a computing device that is coupled to a communication network, with the computing device having a communication session established across the communication network with a remote enterprise network. The handset also includes a controller that registers with a call control system in the remote enterprise network, and manages packet-based telephony services supported by the call control system. During calls, the controller packetizes voice information received using the microphone, transmits formed packets to the enterprise network, receives audio packets from the enterprise network, and generates audio based on data in the received audio packets using the speaker.

Embodiments of the invention provide various technical advantages. According to particular embodiments, these techniques enable the use of enterprise controlled handsets outside of enterprise networks. Furthermore, these techniques enable the use of enterprise controlled handsets outside of fixed access point coverage areas. This can enable remote handsets to access a wide range of PBX-style functions supported by an enterprise call control system. Moreover, according to particular embodiments, these techniques enable secure links between enterprise network and remotely located handsets.

Other technical advantages of the present invention will be readily apparent to one skilled in the art from the following figures, descriptions, and claims. Moreover, while specific advantages have been enumerated above, various embodiments may include all, some, or none or the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 4 is a flowchart illustrating a method for establishing the computing device as a station for remote access to an enterprise network; and FIG. 5 illustrates a method for wireless handsets to remotely receive telephony services from an enterprise network.

DETAILED DESCRIPTION OF THE DRAWINGS

Figure 1:
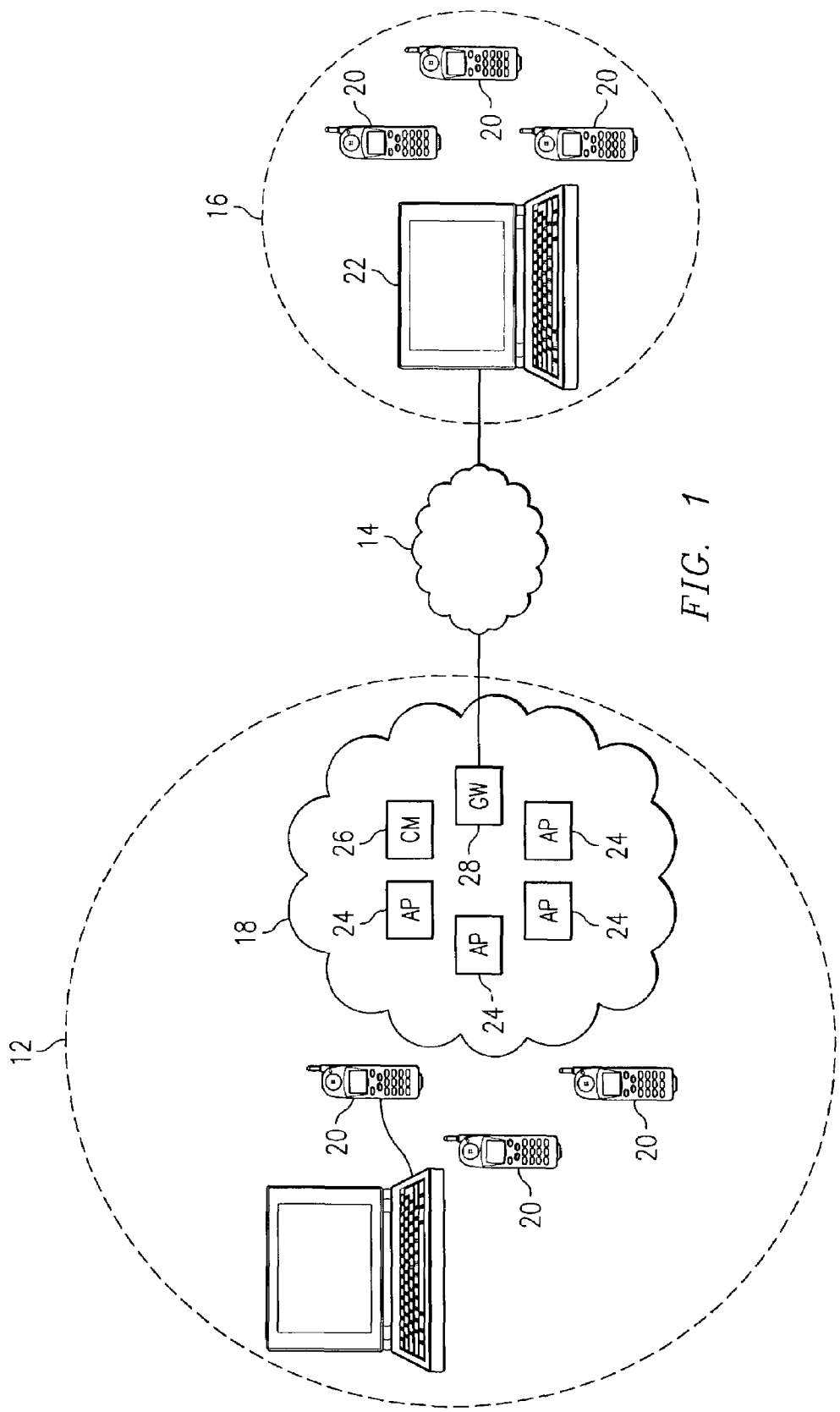
FIG. 1 illustrates a communication system that includes wireless handsets enabled according to various embodiments of the present invention.

FIG. 1 illustrates a communication system, indicated generally at 10, that includes an enterprise network 12, a wide area network 14, and a remote site 16. Enterprise network 12 includes a network infrastructure 18 that supports wireless communications for wireless handsets 20. Site 16 includes handsets 20 and a computing device 22. In general, handsets 20 provide wireless telephony communication services supported by enterprise network 12. At site 16, handsets 20 use computing device 22 as a gateway to telephony services provided by enterprise network 12.

Enterprise network 12 represents any suitable collection and arrangement of components providing packet-based communication services for an enterprise. For example, enterprise network 12 may include the equipment maintained at any number of locations by a company or other organization. In the embodiment illustrated, enterprise network 12 includes network infrastructure 18, which supports wireless communications, packet transport, call control, interfacing with other networks, and other suitable operations. As illustrated, network infrastructure 18 includes access points 24, a call control system 26, and a gateway 28. While not explicitly illustrated, network infrastructure 18 may include any number of other elements, such as switches, routers, and other suitable network components for interconnecting and controlling network infrastructure 18.

Access points 24 support wireless communications for devices, such as handsets 20, within enterprise network 12. According to particular embodiments, access points 24 operate according to 802.11 communication protocols. Thus, access points 24 enable the wireless communication of packets containing any suitable data. For communications with handsets 20, these packets may include voice data, thus enabling voice communications by handsets 20. To manage telephony services, enterprise network 12 includes call control system 26. Call control system 26 supports operations such as signaling, call management, feature assignment and support, line assignment, and group management. For example, when a selected handset 20 within enterprise network 12 first initializes, it may register with call control system 26. In response, call control system 26 can assign telephone lines and features, such as hold, transfer, park, meet me conference, and other appropriate features, to the registered handset 20. Call control system 26 then supports telephony communications of handset 20 by handling signaling, feature support, and other suitable call management operations.

To connect with other networks, enterprise network 12 includes one or more gateways 28. In the embodiment illustrated, gateway 28 links enterprise network 12 to wide area network 14. To provide this link, gateway 28 handles tasks such as routing, protocol conversions, security, and other suitable functions. According to particular embodiments, gateway 28 supports secure links, such as virtual local area network (VLAN) connections, with remote external devices. These links enable remote devices to securely access elements of enterprise network 12 from remote locations, such as site 16. To establish a secure link, gateway 28 and a remote external device may use any suitable encryption, handshakes, logins, and/or other appropriate hardware and/or software security protocols.

Wide area network 14 represents any suitable collection and arrangement of public and/or private network elements supporting communications. For example, wide area network 14 may include elements of a public switched telephone network (PSTN), a global communication network such as the Internet, and/or other suitable communication networks. As illustrated, wide area network 14 provides a communication link between enterprise network 12 and remote site 16.

Site 16 includes handsets 20 and computing device 22. Handsets 20 represent any appropriate wireless communication devices configured to receive telephony services supported by enterprise network 12. According to particular embodiments, handsets 20 support wireless, packet-based communications using 802.11 communication protocols. When in range of access points 24 within enterprise network 12, handsets 20 can register and receive telephony services managed by call control system 26. However, at external locations such as site 16, handsets 20 are outside the effective range of access points 24. To receive telephony services outside of enterprise network 12, handsets 20 use computing device 22 as a gateway to enterprise network 12.

Device 22 provides a wireline link to wide area network 14 and supports wireless communications with handsets 20. Device 22 may be any appropriate equipment, such as a laptop personal computer, a specialized communication device, an appropriately equipped handset 20, or other suitable equipment. In operation, device 22 establishes a communication session with enterprise network 12 across wide area network 14. For example, device 22 may dial into an Internet service provider (ISP) and then form a data connection with gateway 28 of enterprise network 12. Regardless of the technique used to connect with enterprise network 12, the communication session enables the exchange of packets between enterprise network 12 and device 22.

As a part of forming this communication session, device 22 may establish a secure link, such as a VLAN connection, with enterprise network 12. For example, using appropriate security protocols, device 22 may establish a secure session with gateway 28. This session enables secure transport of packets between device 22 and gateway 28. Gateway 28 then permits device 22 access to elements of enterprise network 12 as if device 22 were within enterprise network 12.

Handsets 20 within site 16 communicate wirelessly with device 22 and use device 22 as a gateway for accessing enterprise network 12. According to particular embodiments, handsets 20 and device 22 use peer-to-peer protocols for the wireless exchange of packets. For example, using 802.11 peer-to-peer protocols, handsets 20 and device 22 can wirelessly exchange packets. Device 22 acts as a relay for packets between enterprise network 12 and handsets 20. This enables handsets 20 to receive telephony services provided by enterprise 12 while not within range of access points 24. This allows members of an organization to use their same equipment and receive the same type of telephony services even when outside of an organization's supported network. For example, one or more members of an organization at a remote location can receive telephony services and interact with other members of the organization as if they were within the organization's supported network.

Figure 2:
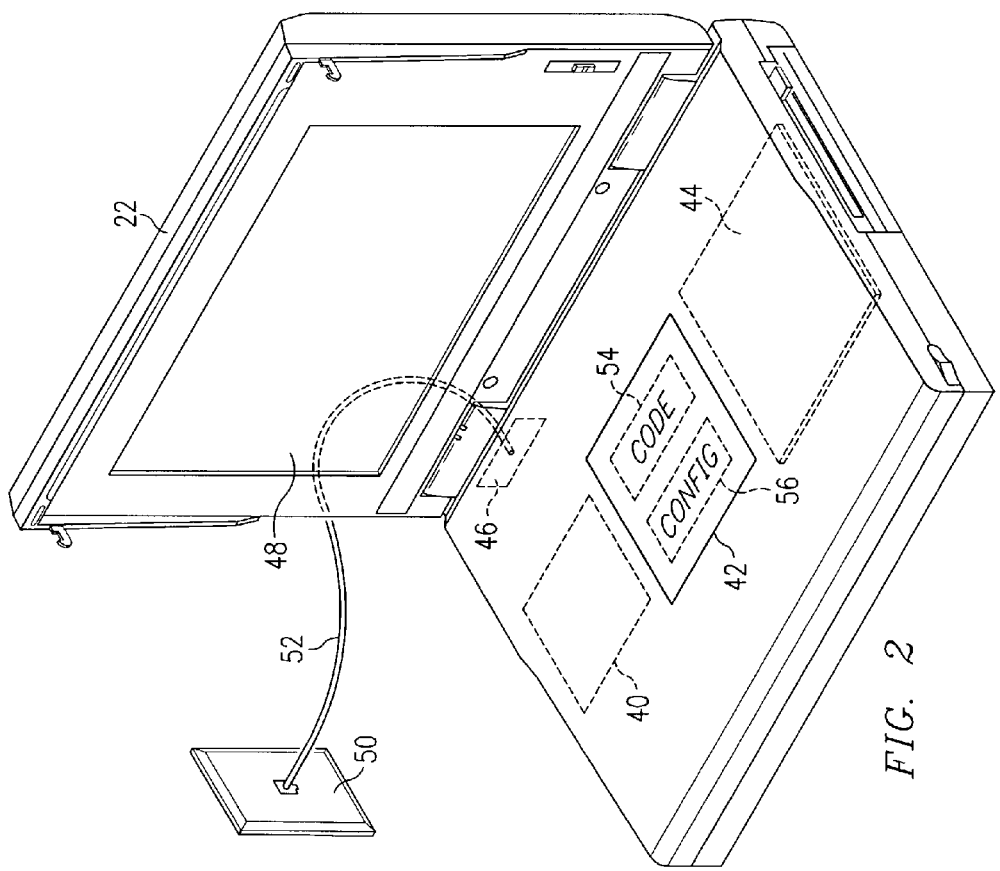
FIG. 2 is a diagram illustrating components of a computing device for supporting remote telephony service access for handsets in the system.

FIG. 2 is a block diagram illustrating exemplary functional components for computing device 22 that include a controller 40, a memory 42, a wireless interface 44, a network interface 46, and a display 48. In the embodiment illustrated, device 22 uses network interface 46 to connect to a network access socket 50 with an interface line 52. During operation, device 22 establishes a communication session with enterprise network 12 using network interface 46 and supports packet-based communications with handsets 20 using wireless interface 44. By relaying packets between enterprise network 12 and handsets 20, device 22 enables handsets 20 to receive telephony services supported by enterprise network 12.

Processor 40 controls the management and operation of device 22. For example, processor 40 may include one or more microprocessors, programmed logic devices, or other suitable controlling elements. Memory 42 maintains information for use during operation of device 22. Memory 42 may include any suitable combination of static and/or dynamic memory elements. In the embodiment illustrated, memory 42 maintains code 54 and configuration information 56. Code 54 includes software, logic routines, microcode, and/or other suitable logic for use in controlling the operation of device 22. For example, code 54 may include software for establishing a communication session with enterprise network 12, forming a secure session with gateway 28, and for conducting wireless, packet-based communications with handsets 20. Configuration information 56 includes settings, configurations, and other suitable information. For example, configuration information 56 may include network addresses, login information, and other appropriate configuration data. In addition, memory 42 may include any other appropriate information for use by device 22 and/or other equipment communicating with device 22.

Wireless interface 44 enables wireless communication of packets with other appropriately enabled devices. For example, wireless interface 44 may be an 802.11 local area network (LAN) wireless interface card within a laptop. Using wireless interface 44, device 22 can communicate packets with handsets 20. As previously discussed, device 22 and handsets 20 may use any suitable wireless communication protocol to exchange packets. However, particular embodiments envision device 22 and handsets 20 using 802.11 peer-to-peer protocols for wireless communications.

Network interface 46 provides an interface for establishing a wireline connection and forming a communication session with enterprise network 12. Using this communication session, device 22 relays packets between enterprise network 12 and handsets 20. However, while device 22 may use a single communication session for relaying packets for multiple handsets 20, system 10 contemplates device 22 establishing any number of communication sessions with enterprise network 12 to support handsets 20.

During and/or after establishing a communication session with enterprise network 12, device 22 may perform various operations to ensure a secure connection. For example, device 22 may establish a secure link with enterprise network 12. This ensures a trusted connection between enterprise network 12 and device 22, and thus enterprise network 12 may permit device 22 access as if within enterprise network 12. However, security features may be handled by handsets 20. Thus, device 22 may act only as a wireless interface and relay for packets between enterprise network 12 and handsets 20.

While the embodiment illustrated and the preceding description focus on a particular embodiment of device 22 that includes specific elements, system 10 contemplates device 22 having any suitable combination and arrangement of elements for providing a wireless interface and packet relaying station for handsets 20. Thus, the functionalities performed by the particular elements illustrated may be separated or combined as appropriate, and the functionalities of some or all of these elements may be implemented by logic encoded in media. Moreover, one of skill in the art will appreciate that, while illustrated as a laptop computer, device 22 may be implemented by any number of types of devices. For example, handset 20, with appropriate accessories and software, could potentially establish a wireline interface and operate as device 22.

Figure 3:
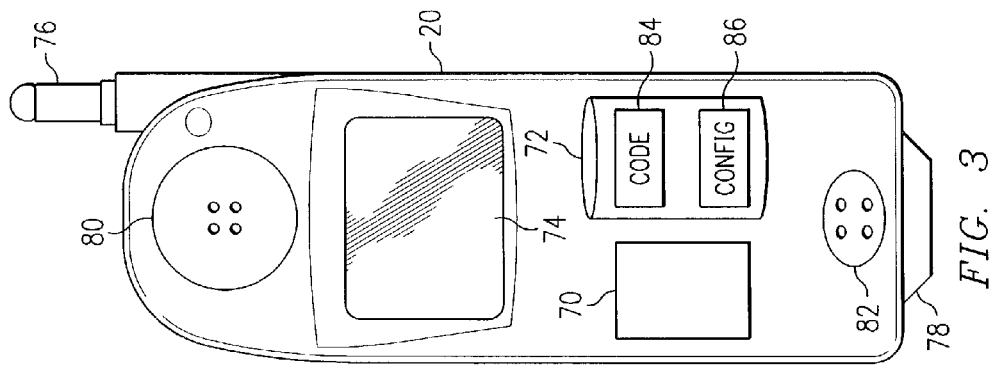
FIG. 3 is a diagram illustrating components of a handset from the system.

FIG. 3 is a diagram illustrating exemplary functional elements for handset 20 that include a controller 70, a memory 72, a display 74, a wireless interface 76, an accessory interface 78, a speaker 80, and a microphone 82. During operation, handset 20 provides voice telephony services using wireless, packet-based communications. Handset 20 provides these services based on the management and control of call control system 26 within enterprise network 12. When outside the range of enterprise network 12, handset 20 uses device 22 as a gateway to enterprise network 12, thus providing remote telephony services supported by call control system 26.

For interactions with a user, handset 20 includes a number of user interfaces, including display 74, speaker 80 and microphone 82. Display 74 presents visual information detailing current status, available options, and other suitable information. For example, display 74 may present a battery indicator, signal strength indicator, a menu of options, and other suitable information depending upon a current state of handset 20. Speaker 80 and microphone 82 enable the generation and receipt of audio. While not specifically shown in this illustration, handset 20 may further include any number of input mechanisms, such as buttons and keypads, suitable for receiving input from a user.

Wireless interface 76 supports wireless, packet-based communications with other appropriately enabled devices. When operating within enterprise network 12, wireless interface 76 communicates with access points 24 to receive packet-based communication services. At external locations, such as site 16, handset 20 uses wireless interface 76 to communicate with device 22 and thus interface to enterprise network 12. As previously mentioned, wireless interface 76 may operate in peer-to-peer communication mode for these communications with device 22.

Appliance interface 78 enables handset 20 to connect via any suitable interface with other appropriately enabled devices. According to particular embodiments, interface 78 permits charging of a battery within handset 20 and interfacing with other appropriately enabled devices. For example, interface 78 may include a serial interface, such as a universal serial bus (USB) port, for coupling to other equipment, such as device 22. Also, appliance interface 78 can support both wired and wireless communications. For example, appliance interface 78 may permit BLUETOOTH, frequency modulation (FM), and/or other appropriate communications.

Controller 70 manages the operation and control of handset 20. For example, controller 70 may be any suitable combination of microprocessors, programmed logic devices, and other suitable controllers. During operation, controller 70 performs operations such as packetization and depacketization of audio, signal processing, and other appropriate tasks. To support these operations, controller 70 may access information maintained within memory 72.

Memory 72 represents any suitable combination of static and/or dynamic memory used by handset 20. In the embodiment illustrated, memory 72 maintains code 84 and configuration information 86. Code 84 includes software, logic modules, microcode, and/or other suitable logic for use by elements of handset 20. For example, code 84 may include logic routines for implementing wireless communication protocols, for interacting with users, for establishing secure sessions, and for other appropriate operations. Configuration information 86 includes settings and other configurations used during operation of handset 20. For example, configuration information 86 may include features and options configured by call control system 26, user and handset identifiers, and other appropriate data.

During operation, handset 20 provides wireless, packet-based communication services to support telephony applications. Handset 20 provides these telephony services by accessing enterprise network 12 according to its current environment. When operating within enterprise network 12, handset 20 establishes communications with access points 24. When outside of the effective range of access points 24, handset 20 may be unable to access telephony services supported by enterprise network 12.

However, as previously discussed, handset 20 may access these telephony services using device 22 as a gateway. Thus, handset 20 establishes wireless communications with device 22 and uses device 22 as a relay for packets with enterprise network 12. For example, using 802.11 peer-to-peer protocols, handset 20 and device 22 can establish a wireless communication link for the exchange of packets. Through device 22, handset 20 can register with call control system 26 within enterprise network 12. This enables call control system 26 to configure handset 20 and support telephony services for handset 20. In this fashion, handset 20 is able to operate as if it were within enterprise network 12. Many of the advantages of this scenario can be highlighted by envisioning an office phone that works as if it were within the office even though it is at a remote location. For example, handset 20 can provide features such as park, pick, intercom, conference, and other PBX-type features based upon the support of call control system 26 and enterprise network 12.

While the embodiment illustrated and the preceding description focus on a particular embodiment of handset 20 that includes specific elements, system 10 contemplates handset 20 having any suitable combination and arrangement of elements for supporting remote access of handset 20 to telephony services of enterprise network 12. Thus, the functionalities performed by the particular elements illustrated may be separated or combined as appropriate, and the functionalities of some or all of these elements may be implemented by logic encoded in media.

FIG. 4 is a flowchart illustrating a method for device 22 to prepare for and service handsets 20 within site 16. Device 22 establishes a wireline connection to wide area network 14 at step 100. For example, device 22 may verify a connection through line 52 to the communication services provided by wide area network 14. Device 22 establishes a communication session with enterprise network 12 across wide area network 14 at step 102. Device 22 may also establish a secure session with gateway 26 of enterprise network 12 at step 104. However, as previously discussed, device 22 may perform only some or none of the security features, while leaving some or all of the security measures to handsets 20.

Device 22 monitors for handsets 20 at step 106. For example, device 22 may scan for peer-to-peer connection requests on various wireless communication channels. Upon detecting a new handset 20 at step 108, device 22 establishes a peer-to-peer link with handset 20 at step 110. For example, using 802.11 peer-to-peer protocols, device 22 and handset 20 can set up a communication channel for packet-based communications. Device 22 services existing peer-to-peer links at step 112. For example, device 22 may forward packets received from handsets 20 to enterprise network 12 using the communication session. Similarly, for packets received from enterprise network 12, device 22 may communicate these packets to the appropriate handset 20.

The preceding flowchart illustrates a relatively simple technique for device 22 to establish a wireline communication session and to service wireless communications of handsets 20, thus, supporting remote telephony services provided by enterprise network 12. However, the preceding flowchart and accompanying description illustrate only an exemplary method of operation, and system 10 contemplates device 22 using any suitable techniques to provide similar functionality. Thus, many of the steps in this flowchart may take place simultaneously and/or in different orders than as shown. In addition, device 22 may use methods with additional steps, fewer steps, and/or different steps, so long as the methods remain appropriate.

FIG. 5 is a flowchart illustrating a method for handset 20 to receive telephony services supported by a remote enterprise network 12. Handset 20 establishes a peer-to-peer link with a wireline connected device, such as device 22, at step 130. For example, using 802.11 peer-to-peer protocols, handset 20 may generate a request for a communication link and then establish this link with device 22. Handset 20 determines whether device 22 has a communication session with enterprise network 12 in place at step 132. If not, handset 20 initiates the establishment of a communication session with enterprise network 12 at step 134. For example, handset 20 may request device 22 to execute communication routines for connecting with enterprise network 12.

Handset 20 determines whether device 22 has a secure connection established at step 136. For example, handset 20 may query whether or not device 22 has a current secure session with enterprise network 12. If not, handset 20 may establish a secure session with gateway 26 of enterprise network 12 at step 138. To establish the secure session, handset 20 may request device 22 to form the session or, alternatively, may establish the session itself. Therefore, device 22 or handset 20 may ensure a secure connection with enterprise network 12.

Once an appropriate connection with enterprise network 12 is in place, handset 20 registers with call control system 26 of enterprise network 12 at step 140. In registering with call control system 26, handset 20 may receive features, line assignments, group assignments, and other suitable configurations from call control system 26. These configurations can populate handset 20 with an array of telephony services supported by enterprise network 12. However, handset 20 may receive these configurations from call control system 26 at any appropriate time and maintain them within memory 72. Thus, the registration with call control system 26 may simply reinstate the ability of handset 20 to access these already configured telephony features.

Once appropriately registered, handset 20 receives telephony services from enterprise network 12 at step 142. This involves the communication of packets to and from enterprise network 12 using device 22 as an intermediary. When receiving these telephony services, handset 20 operates as if it were within enterprise network 12. For example, to call other telephony devices within enterprise network 12, handset 20 could potentially reach those devices using merely their extensions.

Enterprise network 12 can also support calls placed from remote handset 20 to devices outside of enterprise network 12. For these calls, enterprise network 12 may act as an intermediary. For example, consider a call from handset 20 at sight 16 to a telephone outside of enterprise network 12. For the call, call control system 26 handles signaling. Enterprise network 12 links via gateway 28 to device 22, using this link, communicates voice packets to and from handset 20. Enterprise network 12 also links to the remote telephone through an appropriate gateway. Thus, enterprise network 12 acts as an intermediary for the call.

The preceding flowchart illustrates a relatively simple technique for handset 20 to receive telephony services from a remote enterprise network 12. However, the preceding flowchart and accompanying description illustrate only an exemplary method of operation, and system 10 contemplates handset 20 using any suitable techniques to provide similar functionality. Thus, many of the steps in this flowchart may take place simultaneously and/or in different orders than as shown. In addition, handset 20 may use methods with additional steps, fewer steps, and/or different steps, so long as the methods remain appropriate.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A telephony handset comprising:
   a speaker;
   a microphone;
   a wireless interface supporting 802.11 wireless communication protocols, the wireless interface operable to establish a wireless link with a computing device that is coupled to a communication network, the computing device having a communication session established across the communication network with a remote enterprise network; and
   a controller operable to register with a call control system in the remote enterprise network and to manage packet-based telephony services supported by the call control system, the controller further operable, during calls, to packetize voice information received using the microphone, to transmit formed packets to the enterprise network, to receive audio packets from the enterprise network, and to generate audio based on data in the received audio packets using the speaker.

2. The telephony handset of claim 1, wherein the controller is further operable to receive assignment information from the call control system, the assignment information assigning at least one telephone number to the telephony handset.

3. The telephony handset of claim 2, wherein the controller is further operable to receive a ring indication for a call placed to the assigned number, to alert a user, and in response to an offhook indication, to form the call, wherein the call comprises the exchange of voice packets with the enterprise network using the wireless link and the communication session.

4. The telephony handset of claim 1, wherein the communication session comprises a secure link established with a gateway of the enterprise network.

5. The telephony handset of claim 1, wherein the controller is further operable to:
   detect a user indication requesting a call to a remote telephone outside of the enterprise network;

communicate a request to the call control system to establish the call with the remote telephone; and communicate voice packets with the enterprise network during the established call, such that the enterprise network acts as an intermediary for the call with the remote telephone.

6. The telephony handset of claim 1, wherein the wireless interface is further operable to establish the wireless link using an 802.11 peer-to-peer wireless communication protocol.

7. A device for enabling remote access to telephony services, the device comprising:

a wireless interface supporting 802.11 wireless communication protocols;

a network interface operable to couple to a communication network and to establish a communication session with a remote enterprise network across the communication network;

a controller operable to scan for telephony handsets using the wireless interface, to establish a wireless link with a detected telephony handset, and to relay packets between the telephony handset and the enterprise network using the communication session, thus supporting access of the telephony handset to telephony services supported by the enterprise network and supporting registration by the telephony handset with a call control system in the remote enterprise network.

8. The device of claim 7, wherein the controller is further operable to establish the wireless link using an 802.11 peer-to-peer protocol.

9. The device of claim 7, wherein the network interface is further operable to establish a secure link with a gateway in the enterprise network.

10. The device of claim 7, wherein the device is a laptop personal computer coupled to a public switched telephone network using the network interface.

11. A method for receiving remotely supported telephony services, the method comprising:

establishing an 802.11 peer-to-peer wireless link with a computing device that is coupled to a communication network, the computing device having a communication session established across the communication network with a remote enterprise network;

registering with a call control system in the remote enterprise network using packet based communications across the wireless link and the communication session;

receiving assignment information from the call control system, the assignment information assigning at least one telephone number; and managing telephony services for a telephony handset assigned the telephone number, the telephony services supported by the call manger in the remote enterprise network.

12. The method of claim 11, further comprising:

receiving a ring indication for a call placed to the assigned telephone number; and alerting a user to the call;

receiving an offhook indication; and handling the call, wherein the call comprises the exchange of voice packets with the enterprise network using the wireless link and the communication session.

13. The method of claim 11, further comprising establishing a secure link with a gateway of the enterprise network using the communication session.

14. The method of claim 11, further comprising:

detecting a user indication requesting a call to a remote telephone outside of the enterprise network;

communicating a request to the call control system to establish the call with the remote telephone; and communicating voice packets with the enterprise network during the established call, such that the enterprise network acts as an intermediary for the call with the remote telephone.

15. Logic for receiving remotely supported telephony services, the logic encoded in media and operable when executed to:

establish an 802.11 peer-to-peer wireless link with a computing device that is coupled to a communication network, the computing device having a communication session established across the communication network with a remote enterprise network;

register with a call control system in the remote enterprise network using packet based communications across the wireless link and the communication session;

receive assignment information from the call control system, the assignment information assigning at least one telephone number; and manage telephony services for a telephony handset assigned the telephone number, the telephony services supported by the call manger in the remote enterprise network.

16. The logic of claim 15, further operable to:

receive a ring indication for a call placed to the assigned telephone number; and alert a user to the call;

receive an offhook indication; and handle the call, wherein the call comprises the exchange of voice packets with the enterprise network using the wireless link and the communication session.

17. The logic of claim 15, further operable to establish a secure link with a gateway of the enterprise network using the communication session.

18. The logic of claim 15, further operable to:

detect a user indication requesting a call to a remote telephone outside of the enterprise network;

communicate a request to the call control system to establish the call with the remote telephone; and communicate voice packets with the enterprise network during the established call, such that the enterprise network acts as an intermediary for the call with the remote telephone.

19. A telephony handset comprising:

means for establishing an 802.11 peer-to-peer wireless link with a computing device that is coupled to a communication network, the computing device having a communication session established across the communication network with a remote enterprise network;

means for registering with a call control system in the remote enterprise network using packet based communications across the wireless link and the communication session;

means for receiving assignment information from the call control system, the assignment information assigning at least one telephone number; and means for managing telephony services for a telephony handset assigned the telephone number, the telephony services supported by the call manger in the remote enterprise network.

20. A system for receiving remotely supported telephony services, the system comprising:

a computing device comprising a wireless interface supporting 802.11 wireless communication protocols and a network interface operable to couple to a communication network and to establish a communication session with a remote enterprise network across the communication network, wherein the communication session comprises a secure link established with a gateway of the enterprise network, the computing device further comprising a controller operable to scan for telephony handsets using the wireless interface, to establish a wireless link with a detected telephony handset, and to relay packets between the telephony handset and the enterprise network using the communication session; and a telephony handset comprising a wireless interface supporting 802.11 wireless communication protocols and operable to establish a peer-to-peer wireless link with the computing device, the handset further comprising a controller operable to register with a call control system in the remote enterprise network and to manage packet-based telephony services supported by the call control system, the controller further operable to detect a user indication requesting a call to a remote telephone outside of the enterprise network, to communicate a request to the call control system to establish the call with the remote telephone, and to communicate voice packets with the enterprise network during the established call, such that the enterprise network acts as an intermediary for the call with the remote telephone.

* * * * *